United States Patent [19]

Komatsu

[11] Patent Number: 5,274,723
[45] Date of Patent: Dec. 28, 1993

[54] OPTICAL RECEPTACLE

[75] Inventor: Koya Komatsu, Tokyo, Japan

[73] Assignee: NEC Corporation, Japan

[21] Appl. No.: 951,410

[22] Filed: Sep. 25, 1992

[30] Foreign Application Priority Data

Sep. 25, 1991 [JP] Japan .................. 3-245343

[51] Int. Cl.[5] ................................. G02B 6/42
[52] U.S. Cl. ............................. 385/92; 385/36
[58] Field of Search ............. 385/31, 36, 49, 88, 385/92

[56] References Cited

U.S. PATENT DOCUMENTS

| 4,611,884 | 9/1986 | Roberts | 385/33 |
| 4,699,453 | 10/1987 | Roberts | 385/33 |
| 4,701,010 | 10/1987 | Roberts | 385/89 |
| 4,790,618 | 12/1988 | Abe | 385/93 |
| 5,127,075 | 6/1992 | Althaus et al. | 385/94 |

FOREIGN PATENT DOCUMENTS 64-52103 2/1989 Japan .

Primary Examiner—Frank Gonzalez
Attorney, Agent, or Firm—Ostrolenk, Faber, Gerb & Soffen

[57] ABSTRACT

An optical receptacle wherein reflection at the end face of an optical fiber can be prevented accurately with a simple construction without additional provision of a transparent member on which an anti-reflection film is formed and which can be produced at a significantly lower cost than ever. A hole of a receptacle body for receiving an optical connector plug for an optical fiber therein is formed as a bottomed blind hole. An inner bottom face of a bottom portion of the receptacle body defining the bottom of the bottomed blind hole is formed as a flat face perpendicular to the axial line of the blind hole. A rear face of the bottom portion is formed as an inclined face which is inclined with respect to a plane perpendicular to the axial line of the blind hole. At least the bottom portion of the receptacle body is formed from a transparent material having a substantially equal refractive index to that of the optical fiber so as to transmit light therethrough.

3 Claims, 2 Drawing Sheets

OPTICAL RECEPTACLE

BACKGROUND OF THE INVENTION

1. Field of the Invention

This invention relates to an optical receptacle, and more particularly to an optical receptacle of the type wherein an optical connector plug at an end of an optical fiber is inserted into a hole of a receptacle body so as to be coupled to light emitting means or light receiving means.

2. Description of the Related Art

Various optical receptacles of the type mentioned are conventionally known. An exemplary one of conventional optical receptacles is shown in FIG. 1. Referring to FIG. 1, the optical receptacle 1 includes a receptacle body 2 in which a bore or axial hole 3 for receiving a ferule not shown of an optical connector plug at an end of an optical fiber therein is formed over the overall axial length. A thread 4 is formed at a rear portion of an inner periphery of the through-hole 3, and a cup-shaped threaded stopper 5 is screwed in the thread 4 to position the end face of the optical fiber and the end face of the ferule in the axial direction. Another thread 6 is formed at a front portion of an outer periphery of the receptacle body 2, and a cover not shown of the optical connector plug is screwed on the thread 6. When an optical module in which an optical semiconductor element, a lens and other elements are built in a package is to be mounted onto the receptacle body 2 to make an optical device, the threaded stopper 5 is removed and the package of the optical module is fitted into the through-hole 3 of the receptacle body 2 instead.

Where an optical fiber and an optical module are coupled in this manner, however, there is a problem that, since the end face of the optical fiber is a flat face perpendicular to the optical axis and besides is exposed as it is, the light transmitting characteristic of the optical device is deteriorated by reflection of light which occurs at the end face of the optical fiber. In particular, when the optical semiconductor element of the optical module is a light emitting semiconductor element such as a semiconductor laser, light converged by the lens of the optical module is partially reflected by the end face of the optical fiber and directed back to the light emitting semiconductor element to cause, for example, distortion of the waveform of a laser beam to be emitted from the light emitting semiconductor element.

On the other hand, when the optical semiconductor element of the optical module is a light receiving semiconductor element such as a photodiode, there is a drawback that also light propagating in the optical fiber is partially reflected by the end of the optical fiber and directed back into the optical fiber.

Several means for preventing reflection at the end face of an optical fiber have been developed and are disclosed, for example, in Japanese Patent Laid-Open Application No. 64-52103 and U.S. Pat. No. 4,790,618.

According to the means disclosed in Japanese Patent Laid-Open Application No. 64-52103, a glass plate having a refractive index equal to that of an optical fiber is interposed between the end face of the optical fiber, which is a flat face perpendicular to the axial line of the optical fiber, and a lens of an optical module. An anti-reflection film is coated on the entire surface of the glass plate except one face, and the face of the glass plate having no anti-reflection film thereon is held in direct contact with the end face of the optical fiber to prevent otherwise possible reflection at the interface between the face of the glass plate and the end face of the optical fiber. Meanwhile, at the other faces of the glass plate, reflection of light is prevented by the anti-reflection film.

With the means, however, since a high degree of accuracy is required for the installation of a glass plate, there is a problem that the operation for positioning and fixation of the glass plate is difficult. Further, the glass plate must be coated with an anti-reflection film except one face thereof, and accordingly, there is another problem that a high production cost is required.

Meanwhile, according to the means disclosed in U.S. Pat. No. 4,790,618, the end face of an optical fiber and the end face of a ferule are formed as inclined faces which are inclined with respect to a plane perpendicular to an axial line of the optical fiber, and a transparent cap having a refractive index equal to that of the optical fiber and having an outer diameter equal to that of the ferule is adhered to the inclined end faces of the optical fiber and the ferule. Further, an anti-reflection film is applied to the end face of the transparent cap.

With the means, however, it is difficult to adhere a transparent cap, which is small in size, to the inclined end faces of an optical fiber and a ferule with a high degree of accuracy and apply an anti-reflection film to the small end face of the transparent cap, and a high production cost is still required.

SUMMARY OF THE INVENTION

It is an object of the present invention to provide an optical receptacle wherein reflection at the end face of an optical fiber can be prevented accurately with a simple construction without additional provision of a transparent member on which an anti-reflection film is formed.

It is another object of the present invention to provide an optical receptacle which can be produced at a significantly lower cost than ever.

In order to attain the objects, according to the present invention, there is provided an optical receptacle, which comprises a receptacle body having a hole formed therein for receiving an optical connector plug at an end of an optical fiber so as to be coupled to light emitting means or light receiving means, the hole of the receptacle body being a bottomed blind hole whose inner bottom face is defined by a bottom portion of the receptacle body and is formed as a flat face perpendicular to an axial line of the blind hole, the rear face of the bottom portion remote from the inner bottom face of the blind hole being formed as an inclined face which is inclined with respect to a plane perpendicular to the axial line of the blind hole, at least the bottom portion of the receptacle body being formed from a transparent material having a substantially equal refractive index to that of the optical fiber so as to transmit light therethrough.

The receptacle body may be entirely formed into a unitary member from a transparent plastic material having a substantially equal refractive index to that of the optical fiber.

Preferably, the end face of the optical fiber contacts directly with the inner bottom face of the blind hole of the receptacle body.

Preferably, the light emitting means or light receiving means is secured to the receptacle body in an opposing relationship to the rear face of the bottom portion of the receptacle body with the optical axis thereof displaced from the axial line of the blind hole.

In the optical receptacle, when an optical connector plug at an end of an optical fiber is to be inserted into the blind hole of and secured to the receptacle body, if the end faces of the optical fiber and the ferule are abutted with the inner bottom face of the blind hole, then they are automatically positioned with respect to the receptacle body in the axial direction of the optical fiber. Since the bottom portion of the receptacle body defining the inner bottom face of the blind hole is transparent, light is transmitted through the bottom portion. Since the bottom portion is formed from a transparent material having a refractive index substantially equal to that of the optical fiber and the inner bottom face of the blind hole is formed as a flat face perpendicular to the axial line of the blind hole so that the end face of the optical fiber contacts closely with the inner bottom face of the blind hole, reflection of light does not occur at the interference between the inner bottom face of the blind hole and the end face of the optical fiber. Meanwhile, since the rear face of the bottom portion of the receptacle body is formed as an inclined face inclined with respect to a plane perpendicular to the axial line of the blind hole, even if light from light emitting means is reflected by the rear face, the reflected light will not return to the light emitting means. On the other hand, also when light having transmitted through the optical fiber is reflected by the rear face of the bottom portion of the receptacle body, the reflected light will not return into the optical fiber. Accordingly, otherwise possible occurrence of distortion of the waveform of light or some other undesirable influence can be prevented and enhancement of the light coupling efficiency is achieved. Further, since reflection at the end face of the optical fiber can be prevented by the receptacle body itself, a transparent member on which an anti-reflection film is formed as in a conventional optical receptacle is unnecessary, and consequently, the production cost can be reduced remarkably comparing with that of a conventional optical receptacle. Further reduction of the production cost is achieved when the receptacle body is entirely molded into a unitary member from a transparent plastic material.

Since the rear face of the bottom portion of the receptacle body is formed as an inclined face inclined with respect to a plane perpendicular to the axial line of the blind hole, light is refracted at the inclined face. Thus, an optimum optical coupling efficiency can be attained by displacing the optical axis of light emitting means or light receiving means from the axial line of the blind hole taking the amount of the refraction into consideration.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
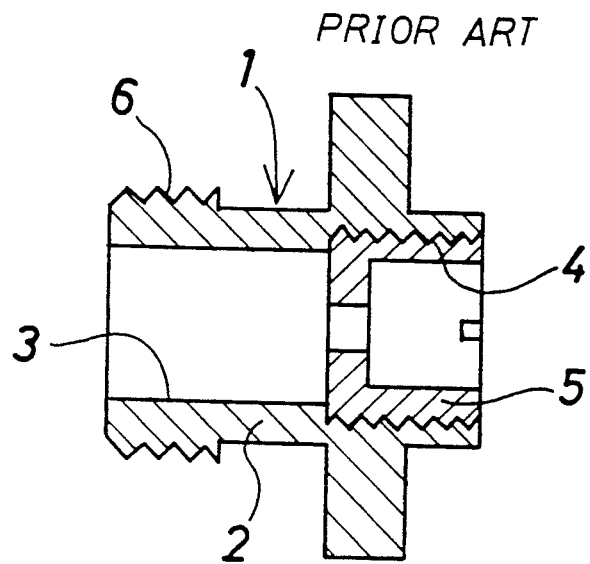
FIG. 1 is a schematic sectional view of a conventional optical receptacle.
Figure 2:
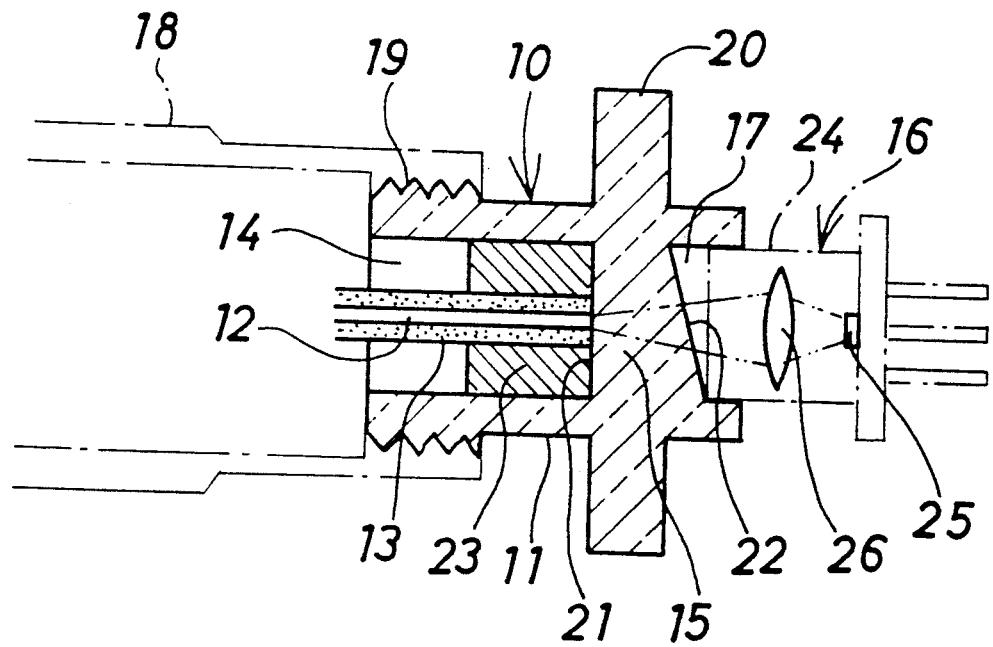
FIG. 2 is a schematic sectional view of an optical receptacle to which the present invention is applied.

Referring first to FIG. 2, there is shown an optical receptacle to which the present invention is applied. The optical receptacle shown is generally denoted at 10 and includes a receptacle body 11 which is entirely precision molded into a unitary member from a transparent plastic material. A circular bottomed bore or blind hole 14 is formed at the front face of the receptacle body 11, and an end portion of a ferule 13 of an optical connector plug at an end of an optical fiber 12 is received in the blind hole 14 and secured to the receptacle body 11. A circular recess 17 for securing an optical module 16 thereto is formed on the rear face of the receptacle body 11 on the rear side of a bottom portion 15 which defines an inner bottom face 21 of the blind hole 14. A screw 19 for securing a cover 18 of the optical connector plug is formed at a front portion of an outer periphery of the receptacle body 11 while a flange 20 is formed at an intermediate portion of the outer periphery of the receptacle body 11. The transparent plastic material employed for the receptacle body 11 may be, for example, an acrylic resin having a high light transmission factor and having a refractive index equal to that of the optical fiber 12.

The inner bottom face 21 of the blind hole 14 is formed as a flat face perpendicular to an axial line of the blind hole 14, and the rear face 22 of the bottom portion 15 (inner bottom face of the recess 17) is formed as an inclined face which is inclined with respect to a plane perpendicular to the axial line of the blind hole 14. The inclination angle of the inclined rear face 22 is set to 3 to 10 degrees from the reason which is hereinafter described.

When an end portion of the ferule 13 is to be secured in the blind hole 14 of the optical receptacle 10, the end face of the optical fiber 12 and the end face of the ferule 13 are contacted directly with the inner bottom face 21 of the blind hole 14, and the axial line of the optical fiber 12 is aligned with the axial line of the blind hole 14 with a bush 23 interposed between the outer periphery of the ferule 13 and the inner periphery of the blind hole 14.

Meanwhile, the optical module 16 is secured to the receptacle body 11 with a package 24 thereof fitted in the recess 17. The optical module 16 in FIG. 2 is shown in the form of a light emitting module wherein a semiconductor laser 25 and a lens 26 are built in the package 24.

Laser light emitted from the semiconductor laser 25 is converged by the lens 26 and introduced into the transparent bottom portion 15 of the receptacle body 11 from the rear face 22. Since the rear face 22 is inclined, even if laser light is reflected by the rear face 22, the reflected light will not return to the semiconductor laser 25. Laser light having passed through the bottom portion 15 of the receptacle body 11 is introduced into the optical fiber 12 by way of the inner bottom face 21 of the blind hole 14. In this instance, however, since the bottom portion 15 of the receptacle body 11 and the optical fiber 12 have an equal refractive index and besides the inner bottom face 21 of the blind hole 14 is a flat face perpendicular to the axial line and is held in close contact with the end face of the optical fiber 12, reflection of light does not occur at the interface between the inner bottom face 21 of the blind hole 14 and the end face of the optical fiber 12.

Since the rear face 22 of the bottom portion 15 of the receptacle body 11 is an inclined face, laser light incident to the bottom portion 15 is refracted at the rear face 22. Thus, an optimum optical coupling efficiency is obtained by displacing the optical axis of the optical module 16 from the axial line of the blind hole 14 taking the amount of such refraction into consideration. If the inclination angle of the rear face 22 is decreased, then light reflected by the rear face 22 to return to the semiconductor laser 25 is increased, but on the contrary if the inclination angle is increased, then the coupling loss is increased. Therefore, it is preferable to set the inclination angle to 3 to 10 degrees.

On the other hand, also when the optical module 16 is formed otherwise as a light receiving module, light propagating in the optical fiber 12 is introduced into the bottom portion 15 of the receptacle body 11 from the end face of the optical fiber 12 and the inner bottom face 21 of the blind hole 14, whereupon no reflection of the light occurs similarly. Further, the incidence light then passes the rear face 22 of the bottom portion 15, and thereupon, part of the incidence light is reflected by the rear face 22. However, since the rear face 22 is inclined, the reflected light therefrom will not be introduced back into the optical fiber 12.

Figure 3:
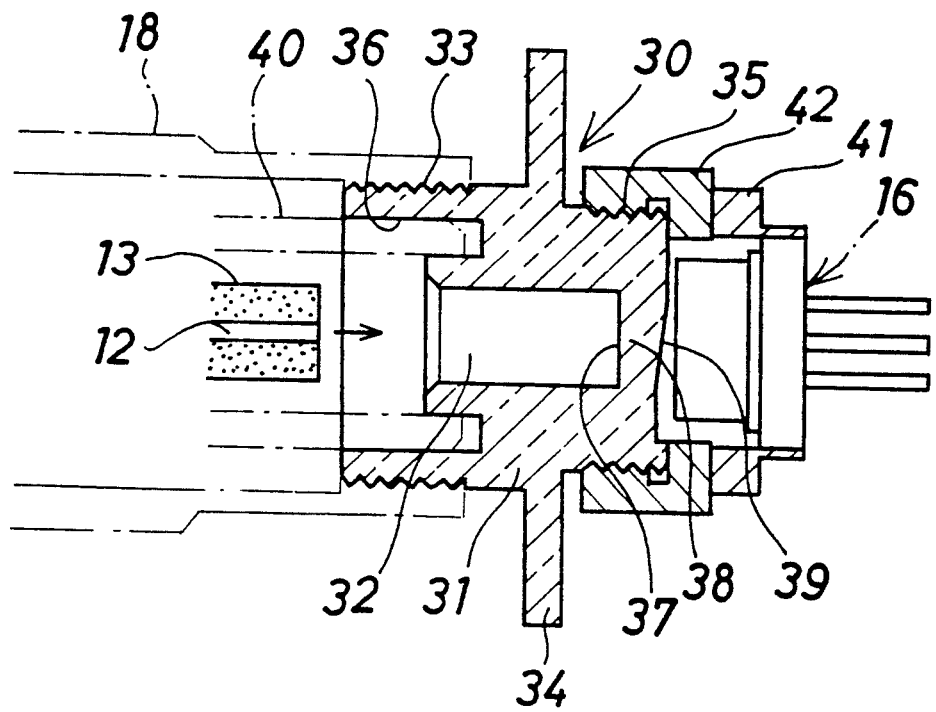
FIG. 3 is a schematic sectional view of another optical receptacle to which the present invention is applied.

Referring now to FIG. 3, there is shown another optical receptacle to which the present invention is applied. The optical receptacle is generally denoted at 30 and includes a receptable body 31 which is also precision molded into a unitary member from a transparent plastic material. The receptacle body 31 has a blind hole 32 on the front face, a thread 33 at a front portion of the outer periphery and a flange 34 at an intermediate portion of the outer periphery thereof, but it does not have a recess at the rear face thereof and instead has a thread 35 formed at a rear portion of the outer periphery thereof. The receptacle body 31 further has a ferule securing recess 36 formed therein around the blind hole 32.

The inner diameter of the blind hole 32 has a sufficient dimension to allow the ferule 13 to be fitted therein. Similarly as in the optical receptacle shown in FIG. 2, the inner bottom face 37 of the blind hole 32 is formed as a flat face perpendicular to the axial line of the blind hole 32, and the rear face 39 of the bottom face 38 of the blind hole 32 is formed as an inclined face which is inclined with respect to a plane perpendicular to the axial line of the blind hole 32.

In the case of the present optical receptacle, when an optical connector plug at the end of the optical fiber 12 is to be secured to the receptacle body 31, an end portion of the ferule 13 is fitted into the blind hole 32 until the end face of the ferule 13 and the end face of the optical fiber 12 are contacted with the inner bottom face 37, and the ferule 13 is secured to the recess 36 by means of a securing member 40. The cover 18 of the optical connector plug is secured to the outer periphery of the receptacle body 31 by means of the screw 33.

Meanwhile, the optical module 16 is held on the rear face of a nut 42 by way of a ring 41 and is secured to the receptacle body 31 by screwing the nut 42 onto the thread 35 of the receptacle body 31. In this instance, the optical module 16 is adjusted by means of the ring 41 so that the optical axis thereof may be displaced from the optical axis of the blind hole 32 by an amount corresponding to a degree of refraction of light at the rear face 38 of the blind hole 32.

Figure 4:
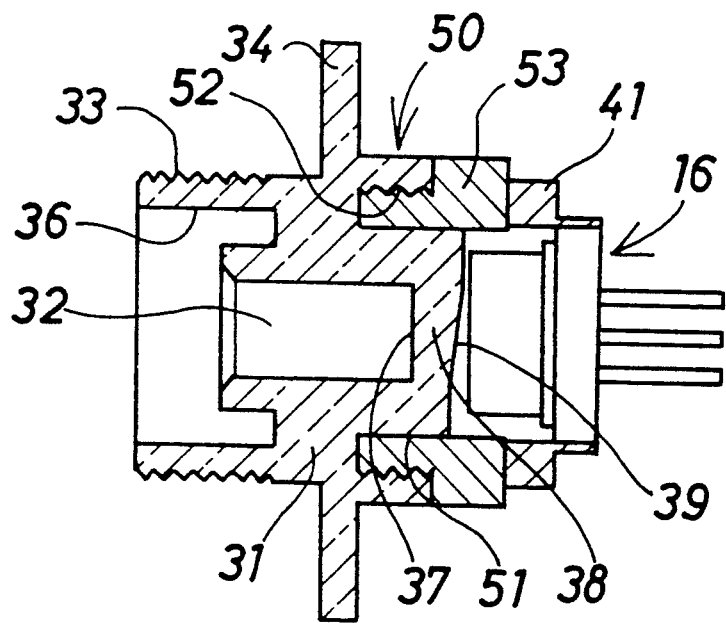
FIG. 4 is a schematic sectional view of a further optical receptacle to which the present invention is applied.

Referring now to FIG. 4, there is shown a further optical receptacle to which the present invention is applied. The optical receptacle generally denoted at 50 is a modification to and is different from the optical receptacle 30 shown in FIG. 3 in that a rear portion of the receptacle body 31 has a little different profile. In particular, a ring groove 51 is formed on the rear face of the receptacle body 31, and a thread 52 is formed on an inner periphery of the ring groove 51. Further, a threaded sleeve 53 is employed in place of the nut 42 of the optical receptacle 30 of FIG. 3, and the optical module 16 is held on the rear face of the sleeve 53 by way of a ring 41 similar to that of the optical receptacle 30 of FIG. 3. The optical module 16 is secured to the receptacle body 31 by screwing the threaded sleeve 53 into the ring groove 51. The optical receptacle 50 provides surer fixation of the optical module 16 than the optical receptacle 30 shown in FIG. 3.

Having now fully described the invention, it will be apparent to one of ordinary skill in the art that many changes and modifications can be made thereto without departing from the spirit and scope of the invention as set forth herein.

What is claimed is:

1. An optical receptacle, comprising:
a receptacle body having a hole formed therein for receiving an optical connector plug at an end of an optical fiber so as to be coupled to light emitting means or light receiving means, said receptacle body being formed of a transparent plastic material having a substantially equal refractive index to that of the optical fiber, said hole of said receptacle body having an open end, a closed end and a longitudinal axis, the closed end having a first face facing the open end and a second face facing away from the open end, the first face being flat and being perpendicular to the longitudinal axis of said hole, the second face being inclined with respect to a plane perpendicular to the longitudinal axis of said hole, said hole being structured and arranged such that the optical fiber is received in the hole with an end face of the optical fiber directly contacting the first face of the closed end; and means on said receptacle body for receiving said light emitting means or light receiving means such that said light emitting means or light receiving means faces said second face of the closed end of the hole and, in the case of the light emitting means, emits light that impinges on said second face, is refracted thereby, is transmitted from the second face to the first face and is then received by the optical fiber and, in the case of said light receiving means, receives light from the optical fiber after said light is transmitted from the first face to the second face and is refracted at the second face to the light receiving means.

2. An optical receptacle as in claim 1, further including an optical fiber received in the hole such that a flat end of the optical fiber is in contact with the first face of the closed end of the hole.

3. An optical receptacle as in claim 2, further including light emitting means or light receiving means received in the optical receptacle such that said light emitting means or light receiving means faces said second face of the closed end of the hole with the optical axis thereof displaced from and parallel to the longitudinal axis of said hole.

* * * * *